United States Patent Office.

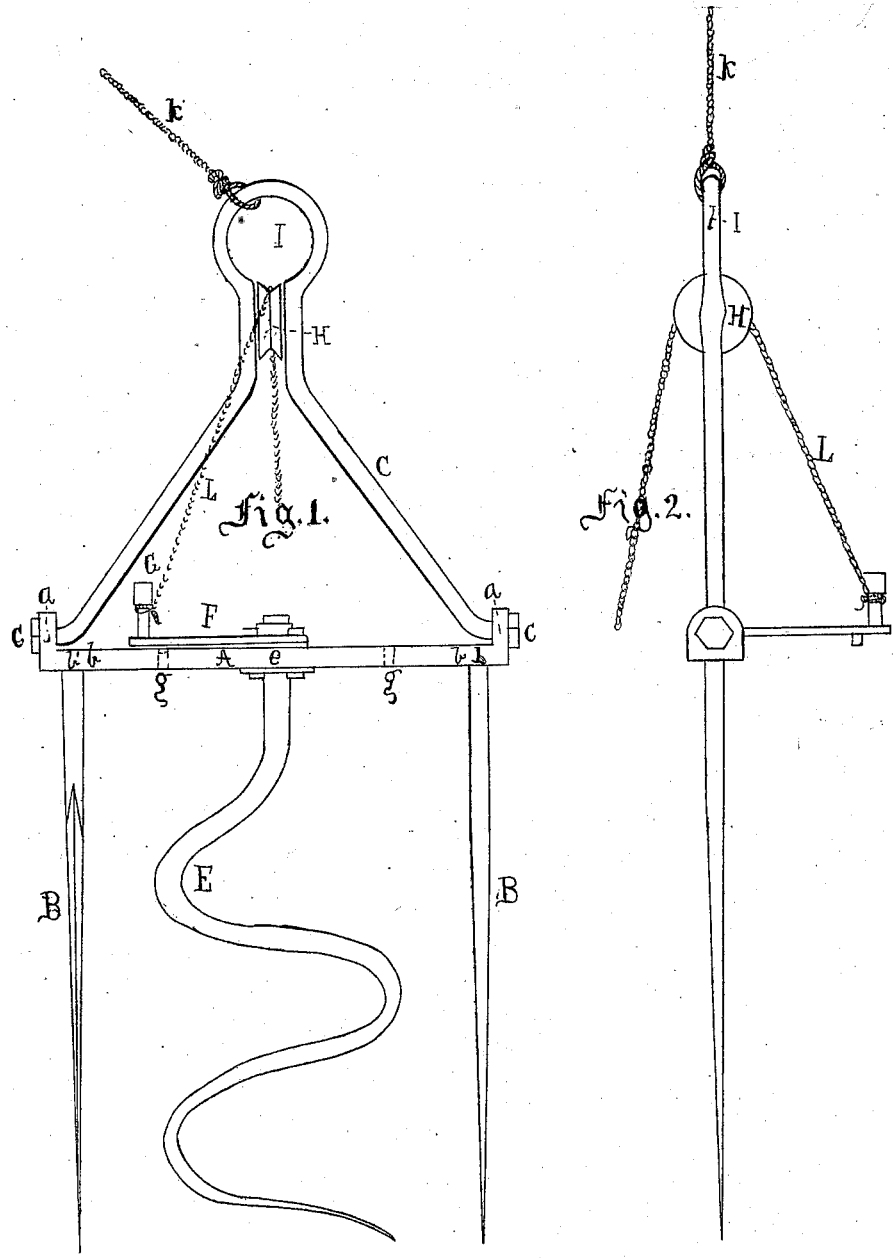

EDWARD M. PARKER, OF ZION, MARYLAND.

Letters Patent No. 78,820, dated June 9, 1868.

IMPROVEMENT IN HORSE HAY-FORKS.

*The Schedule referred to in these Letters Patent and making part of the same.*

TO ALL WHOM IT MAY CONCERN:

Be it known that I, EDWARD M. PARKER, of Zion, county of Cecil, and State of Maryland, have invented certain new and useful Improvements in Horse Hay-Forks; and I do hereby declare that the following is a full, clear, and exact description of the same, reference being had to the accompanying drawings, and the letters of reference marked thereon, making part of this specification, in which—

Figure 1 is a plan view of my fork.

Figure 2 is a sectional view.

Figure 3 is a view of the cross-head, with the ratchet-bar inserted.

I am aware that hay-forks or elevators have been used with two parallel straight tines, and one centre auger-tine. In hay-forks of this construction, the pressure upon the cross-head is supposed to be sufficient to force the two parallel straight tines into the bale or bundle, and cause the centre or auger-tine to make curvature revolutions enough to obtain a hold. It has, however, been found by practical experience that this pressure upon the cross-head will not force the centre or auger-tine sufficiently far to obtain a hold strong enough to raise the bundle or bale, if composed of the coarser straw, such as wheat, rye, &c. In closely-packed timothy-hay, after it has been subjected to the action of the press, it may answer.

The nature of my invention consists in so arranging, in an ordinary cross-head, two parallel straight tines and a curved or auger-tine, the curved tine being forced into the bale or bundle, by means of a ratchet-arm or lever arranged on the cross-head, and which is controlled by a pin held by suitable openings in the face of the cross-head.

My invention also consists in securing in suitable projections, in the ends of the cross-head, the hoisting-yoke, so arranged that it acts on the well-known principle of the ordinary hinged joint, so that in elevating the fork, should the same come in contact with any cross-beam or timber that may project from the beams of the loft, the fork, instead of being checked by the same, will instantly be "pushed out" and caused to occupy an inclined or vertical position until the obstruction is passed.

My invention also consists in constructing the straight tines with sharp cutting-edges, which greatly facilitates the operation of inserting the same into the hay, as with the sharp cutting-edges not near so great pressure upon the cross-head is required.

To enable others skilled in the art to make and use my invention, I will now proceed to describe its construction and operation.

A is the cross-head. B B are the straight tines. The cross-head A is made of cast iron, and the straight tines B B of steel or other suitable metal, the same being inserted in the cross-head A, at the extreme end, by means of suitable openings provided with female screws $b\ b$. The tines B B are provided at their head with thread-screw heads $b'\ b'$, by which they can be readily inserted and held. C is the elevating-yoke, which is hinged to a bearing-support in the cross-head A, the same being struck up with flanges or projecting bearings $a$. The elevating-yoke C has a triangular formation, fitted to go through the openings in the bearing $a$ of the cross-head A, and is provided with a thread on which fits and works a nut, $c$.

In the centre of the cross-head A there is a square opening, through which passes the centre, curved, or auger-tine E, which passes through the cross-head at the opening $e$, and is secured by nuts which afford a necessary bearing at its upper point of contact. Beneath the upper bearing of this curved tine, I attach the lever-arm F. This lever-arm is provided at its outer end with a ratchet-pin or pawl, G, which works and falls by its own gravity in the openings or slots $g\ g$ of the cross-head A. H is a pulley-wheel, inserted in the straight face of the angle of the hoisting-yoke C. I is a loop, formed at the upper end of the yoke, to which is tied the hoisting-rope K.

The operation is as follows:

It will be observed that the straight tines are made with angular or cutting-surfaces, which insures their ready insertion into the hay or the bale which it is desired to elevate. The curved tine E is revolved by the crank-arm F, which gradually buries itself, as the arm is revolved, into the mass of hay until the desired tension is attained. At any revolution, the catch-pin G can be readily let fall into the opening or slot $g$, in the cross-head A, whereby its action is completely stopped, and the entire mechanism locked for hoisting purposes. To the pin or bolt $g$, I attach an unshipping-rope, L, by means of which, after the straight tines have been inserted into the hay, the crank-lever F, controlling the curved tine E, is sufficiently revolved to bring the curved tine so far as to insure the bearing requisite to elevate the bale or bundle. By the fall of the key or catch G, the device is securely locked, when, by means of a hoisting-rope applied to the loop I of the hoisting-yoke, the bale or bundle of hay can be safely elevated to the desired loft, or other convenient place, when simply by pulling on the unshipping-rope L the ratchet-key or pawl is withdrawn, and so held free that the ratchet-arm F will freely revolve, and thus permit the centre or curved tine to discharge the load at the desired point.

I am aware that straight tines, in combination with the centre or curved tine, have before been used; but my straight tines are provided with a cutting-edge, and my centre or curved tine does not depend upon the direct pressure applied to the cross-head, its action being controlled entirely by a ratchet-lever, having a catch-pin working through suitable slots or openings in its extreme end, and also by means of my hinged yoke, after the centre tine has been inserted a sufficient depth to give the desired purchase to the bale or bundle, my hoisting-yoke C, having its bearings in the cross-head A, upon the well-known principle of the hinged joint, will readily accommodate itself when it comes in contact with any projecting beam or timber, as to throw the bale or bundle out of a perpendicular line, and assume a direction at an acute angle until the obstruction is passed.

Having thus fully described my invention, what I claim therein as new, and desire to secure by Letters Patent of the United States, is—

A hay-fork or elevator, when the same is provided with two straight tines, in combination with a centre tine, of curved formation, the latter being controlled by a crank-lever with a suitable bearing-pin.

In testimony whereof, I have signed my name to this specification in the presence of two subscribing witnesses.

E. M. PARKER.

Witnesses:
  HENRY L. PHYSICK,
  R. K. MORTON.